US007869784B2

(12) United States Patent
Liu

(10) Patent No.: US 7,869,784 B2
(45) Date of Patent: Jan. 11, 2011

(54) RADIO FREQUENCY CIRCUIT WITH INTEGRATED ON-CHIP RADIO FREQUENCY INDUCTIVE SIGNAL COUPLER

(75) Inventor: Lianjun Liu, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 854 days.

(21) Appl. No.: 11/679,573

(22) Filed: Feb. 27, 2007

(65) Prior Publication Data

US 2008/0207159 A1 Aug. 28, 2008

(51) Int. Cl.
*H04B 1/28* (2006.01)

(52) U.S. Cl. .................... 455/333; 455/252.1; 455/334; 455/253.1

(58) Field of Classification Search ................. 455/333, 455/334, 338, 130, 230, 252.1, 253.1, 253.2; 336/2, 223
See application file for complete search history.

(56) References Cited

U.S. PATENT DOCUMENTS 6,198,374 B1 * 3/2001 Abel .......................... 336/200
6,307,169 B1 10/2001 Sun et al.
6,307,452 B1 10/2001 Sun
6,384,353 B1 5/2002 Huang et al.
6,507,475 B1 1/2003 Sun
6,706,548 B2 3/2004 Liu
6,794,101 B2 9/2004 Liu et al.
6,803,849 B2 * 10/2004 Lowther ..................... 336/200
7,253,712 B1 * 8/2007 Papananos .................. 336/200
2002/0097128 A1 * 7/2002 Imam ......................... 336/223
2002/0105406 A1 * 8/2002 Liu et al. .................... 336/200
2004/0036551 A1 * 2/2004 Hirabayashi ................ 333/101
2006/0141979 A1 6/2006 Liu et al.
2006/0170503 A1 * 8/2006 Lee et al. .................... 330/307
2006/0202789 A1 * 9/2006 Hyvonen .................... 336/200
2008/0139131 A1 * 6/2008 Macphail .................. 455/90.2

* cited by examiner

*Primary Examiner*—Lana N Le
(74) *Attorney, Agent, or Firm*—Ingrassia Fisher & Lorenz, P.C.

(57) ABSTRACT

A radio frequency (RF) circuit (100) as disclosed herein is fabricated on a substrate (204, 304) using integrated passive device (IPD) process technology. The RF circuit (100) includes an RF inductor (200, 300) and an integrated inductive RF coupler (202, 302) located proximate to the RF inductor (200, 300). The inductive RF coupler (202, 302), its output and grounding contact pads, and its transmission lines are fabricated on the same substrate (204, 304) using the same IPD process technology. The inductive RF coupler (202, 302) includes a coupling section (212, 306) that is either located inside or outside a spiral of the RF inductor (200, 300). The inductive RF coupler (202, 302) and the RF inductor (200, 300) are cooperatively configured to function as the windings of an RF transformer, thus achieving the desired coupling. The inductive RF coupler (202, 302) provides efficient and reproducible RF coupling without increasing the die footprint of the RF circuit (100).

18 Claims, 3 Drawing Sheets

RADIO FREQUENCY CIRCUIT WITH INTEGRATED ON-CHIP RADIO FREQUENCY INDUCTIVE SIGNAL COUPLER

TECHNICAL FIELD

Embodiments of the techniques and technologies described herein relate generally to electronic components. More particularly, the embodiments described herein relate to radio frequency (RF) couplers for use with electronic components that employ integrated passive devices.

BACKGROUND

The prior art is replete with electronic devices and components designed for high frequency data communication applications. A common practical application for such devices and components is cellular telephony systems. In this regard, the need for component integration will increase as module sizes decrease for high performance cellular phones with advanced features. Cellular phone radio transmitters use several passive components for functions such as filtering, impedance matching, and switching. Several of these components can be integrated to improve module parameter control and cost. A harmonic filter is used for signal selectivity over radio bands, while an RF coupler is used for signal level sensing and control. For example, an RF coupler may be used to couple an RF signal in a transmit path to a detector for signal power level control. In conventional applications, an RF coupler and a harmonic filter are two separate components, each having a physical size of approximately one square millimeter. In such applications, the use of distinct components necessarily adds to the overall footprint of the module, while increasing manufacturing and assembly cost. In addition, the use of a separate RF coupler requires different device fabrication processes, which in turn may lead to unpredictable coupling performance, impedance matching, and other operating characteristics.

Some integrated RF coupler designs may be highly sensitive to alignment tolerances associated with the photolithography process utilized to create the RF device. Other integrated RF coupler designs may rely on capacitive coupling effects, which increase the amount of coupling at the cost of directivity. Such loss of directivity may be undesirable, particularly for directional RF couplers.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
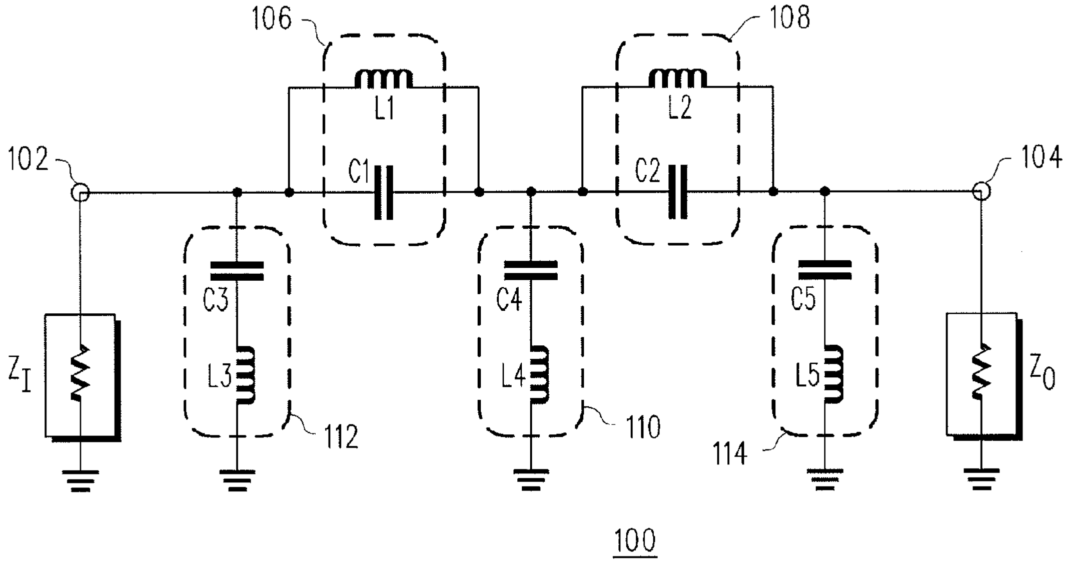
FIG. 1 is a schematic circuit diagram of an embodiment of a harmonic filter topology.

The following detailed description is merely illustrative in nature and is not intended to limit the embodiments or the application and uses of such embodiments. Furthermore, there is no intention to be bound by any expressed or implied theory presented in the preceding technical field, background, brief summary or the following detailed description.

The invention may be described herein in terms of functional and/or schematic components. It should be appreciated that such components may be realized in any number of practical ways. For example, an embodiment of the circuits described herein may employ various elements, e.g., conductive traces, wire bonds, integrated passive devices, semiconductor substrate materials, dielectric materials, or the like, which may have characteristics or properties known to those skilled in the art. In addition, those skilled in the art will appreciate that the embodiments described herein may be practiced in conjunction with any number of RF circuit topologies and applications, and that the harmonic filter circuits described herein merely represent suitable applications for such embodiments.

For the sake of brevity, conventional techniques related to RF circuit design, RF signal coupling, RF impedance matching, semiconductor process technology, integrated passive device fabrication, and other aspects of the circuits (and the individual operating components of the circuits) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to nodes or features or elements being "connected" or "coupled" together. As used herein, unless expressly stated otherwise, "connected" means that one node/feature/element is directly connected to another node/feature/element, and not necessarily mechanically. Likewise, unless expressly stated otherwise, "coupled" means that one node/feature/element is directly or indirectly coupled to another node/feature/element, and not necessarily mechanically. For example, although the schematic shown in FIG. 1 depicts one example arrangement of elements, additional intervening elements, devices, features, or components may be present in an actual embodiment.

An embodiment of an electronic device configured as described herein includes an integrated inductive RF coupler. The inductive RF coupler is formed on the same substrate as the RF section of the electronic device, and the electronic device and the inductive RF coupler are fabricated using the same semiconductor process technology. The electronic device with integrated inductive RF coupler can be realized without an increase in the footprint of the device, thus reducing the overall size and packaging requirements of the integrated device.

Figure 2:
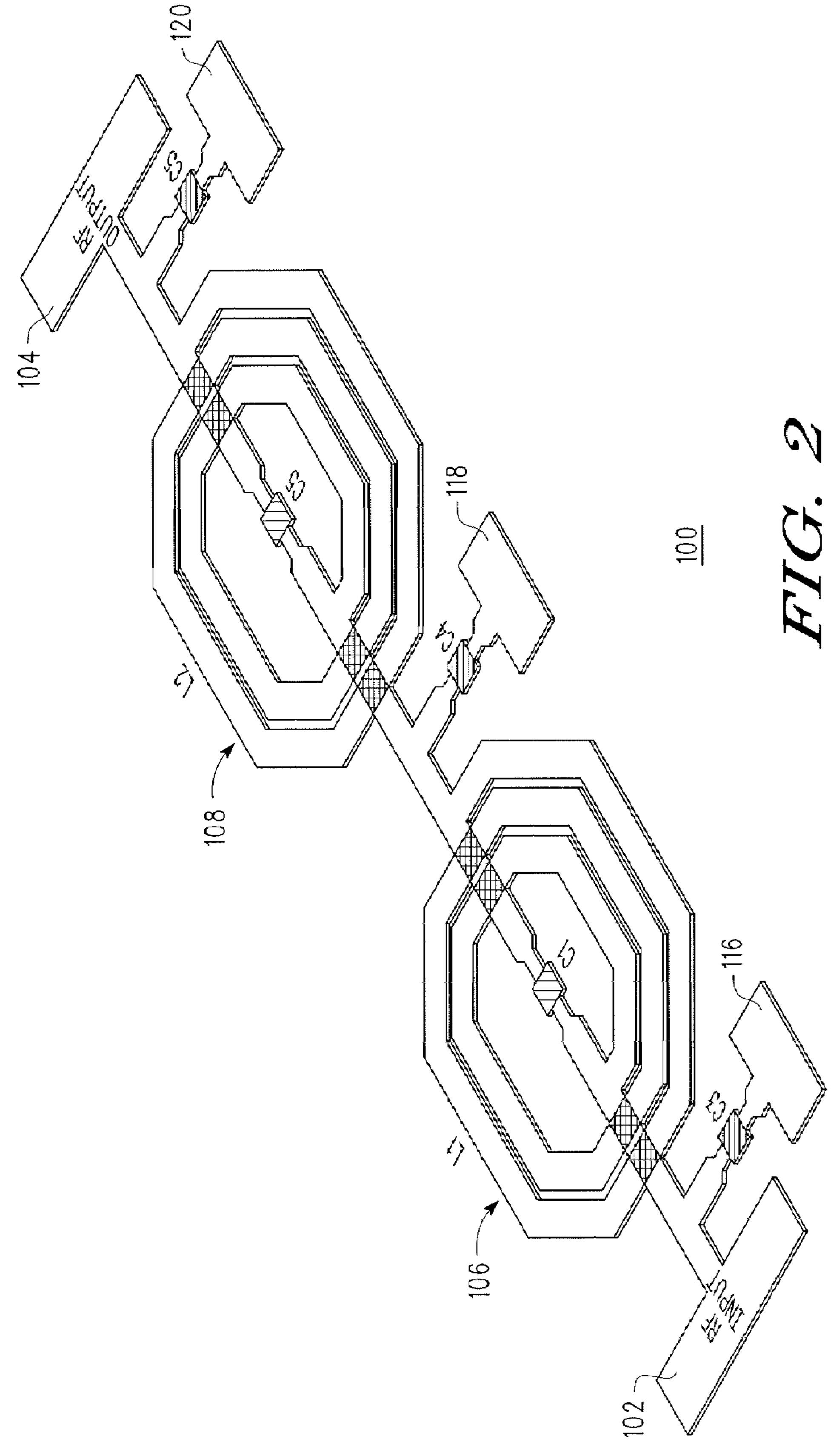
FIG. 2 is a perspective view of a device layout for the harmonic filter shown in FIG. 1.

FIG. 1 is a schematic diagram showing the general topology of an RF harmonic filter 100, and FIG. 2 is a perspective view of an example integrated passive device (IPD) layout for harmonic filter 100. An RF signal enters harmonic filter 100 at an input port 102, and a filtered RF signal within the desired RF band is provided at an output port 104. In the practical layout shown in FIG. 2, the RF energy propagates over conductive traces formed on an insulating (semiconducting) substrate. Harmonic content associated with the RF input signal is rejected by three harmonic resonance circuits: a second harmonic circuit 106; a third harmonic circuit 108; and a fourth harmonic circuit 110. Second harmonic circuit 106 is realized as an LC tank circuit (inductor L1 in parallel with capacitor C1), third harmonic circuit 108 is realized as an LC tank circuit (inductor L2 in parallel with capacitor C2), and fourth harmonic circuit 110 is realized as an LC series combination (capacitor C4 in series with inductor L4). Harmonic filter 100 also includes an input impedance matching circuit 112 and an output impedance matching circuit 114. Input impedance matching circuit 112 is realized as an LC series combination (capacitor C3 in series with inductor L3), and output impedance matching circuit 114 is realized as an LC series combination (capacitor C5 in series with inductor L5). The specific inductor and capacitor values of harmonic filter 100 are selected according to the desired filtering characteristics and the desired output frequency band. For example, harmonic filter 100 may be suitably configured for operation with AMPS/GSM applications (824-915 MHz) or DCS/PCS applications (1710-1910 MHz).

In practice, IPDs (Integrated Passive Devices) can be used to effectively reduce component and module sizes. As used herein, an IPD is a passive electronic device or a passive electronic component that can be fabricated using semiconductor process technology. An IPD can be produced with very high precision, excellent reproducibility, and low cost in high quantities by utilizing semiconductor wafer processing technologies. The layout of harmonic filter 100 shown in FIG. 2 represents an IPD realization, where all of the depicted elements are formed on the same substrate (e.g., a semiconductor or insulating substrate such as GaAs, glass, or ceramic) using the same semiconductor process technology (i.e., the fabrication or manufacturing process by which the IPD is formed). In FIG. 2, inductors L1 and L2 are realized as conductive RF signal line loops (air bridges are employed at the four "intersections" of each inductor to insulate the inductor loops from the respective C1 and C2 transmission lines), and the capacitors are formed as IPDs on the substrate in the desired locations. Notably, inductors L3, L4, and L5 (not shown in FIG. 2) are realized as wire bonds between respective contact pads (numbered 116, 118, and 120 in FIG. 2) and ground pads, which may be off-chip. Thus, inductors L3, L4, and L5 are not actually part of the IPD itself, and harmonic filter 100 may be referred to as a "two inductor" IPD.

Figure 3:
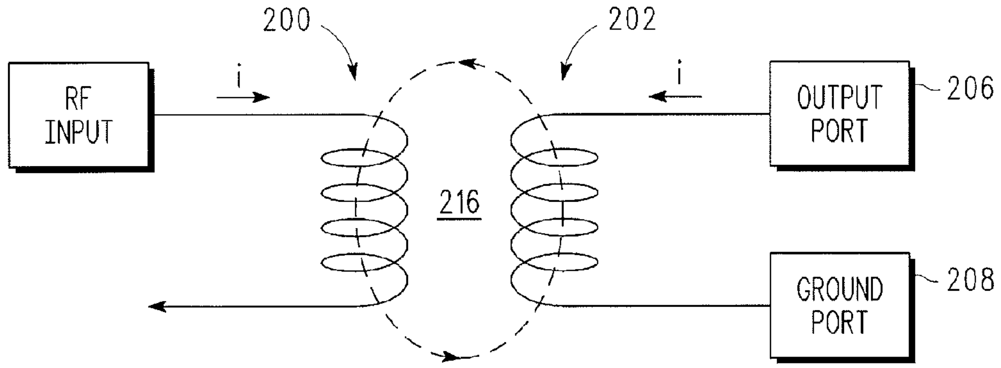
FIG. 3 is a schematic representation of an RF inductor and an inductive RF coupler arranged in accordance with an embodiment of the invention.
Figure 4:
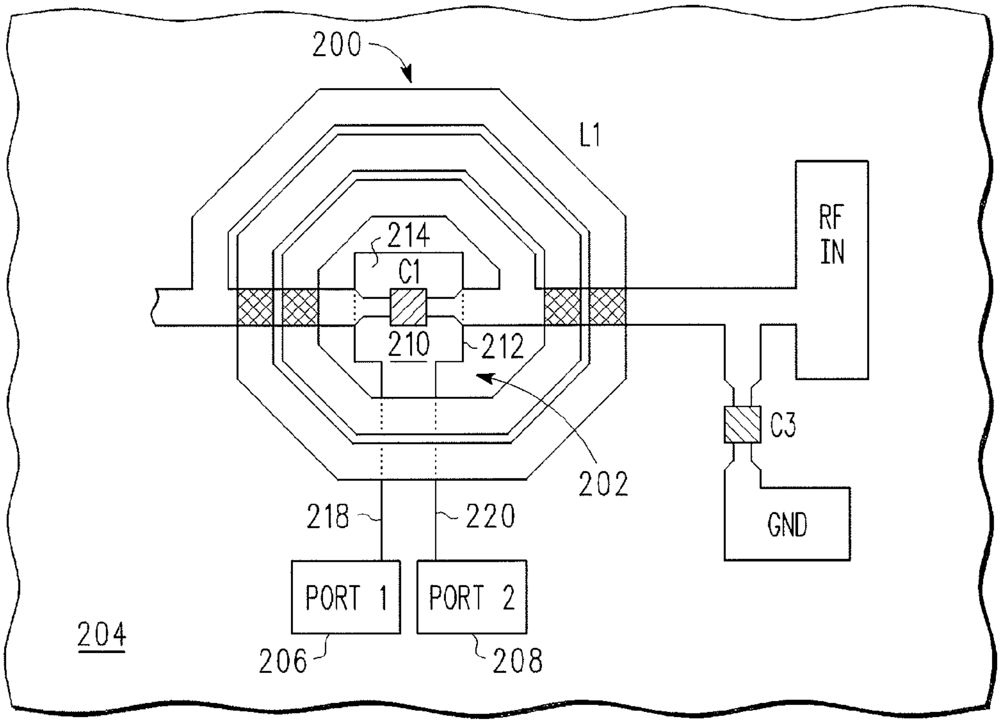
FIG. 4 is a top view of a device layout for an RF inductor and an inductive RF coupler formed on a common substrate in accordance with an embodiment of the invention.

In accordance with one embodiment, an inductive RF coupler is formed on the same substrate, using the same semiconductor process technology, as the corresponding RF circuit (e.g., a harmonic filter circuit). In this manner, an inductive RF coupler can be integrated with the RF circuit by forming the necessary conductive trace or traces of the inductive RF coupler using the same fabrication process. In this regard, FIG. 3 is a schematic representation of an RF inductor 200 and an inductive RF coupler 202 arranged in accordance with an embodiment of the invention, and FIG. 4 is a top view of an exemplary device layout for RF inductor 200 and inductive RF coupler 202, as may be formed on a common semiconductor substrate 204. In this example, FIG. 4 corresponds to the input section of a harmonic filter such as that shown in FIG. 1. In this regard, RF inductor 200 may be suitably configured as an input inductor for a harmonic filter. Each of the RF circuits shown in FIG. 3 and FIG. 4 includes a first port (which may be realized as a contact pad) 206 for inductive RF coupler 202, and a second port (which may be realized as another contact pad) 208 for inductive RF coupler 202. In FIG. 3, the first port 206 represents the output port of inductive RF coupler 202, while the second port 208 represents the ground port of inductive RF coupler 202.

In accordance with known semiconductor fabrication techniques, RF inductor 200, inductive RF coupler 202, the IPD components, and other elements of the RF circuit shown in FIG. 4 may be formed on a common semiconductor substrate using a plurality of metal layers and a number of dielectric layers. The metal layers are deposited or otherwise formed on the substrate, and the desired conductive traces are etched or otherwise formed from the metal layers. The metal layers are typically referred to as "metal 1," "metal 2," "metal 3," and so on to indicate the order in which they are deposited or formed onto the substrate during the fabrication process. Thus, the metal 1 layer is the lowest layer, the metal 2 layer is a higher layer relative to the metal 1 layer, the metal 3 layer is a higher layer relative to the metal 2 layer, and so on. In accordance with one practical embodiment, inductive RF coupler 202 is formed from the metal 1 layer, at least portions of the IPD capacitors and resistors are formed from the metal 2 layer, and the loops of RF inductor 200 are formed from the metal 3 layer. In accordance with one practical semiconductor process technology, metal 1 elements are approximately 0.6 μm to 2.0 μm thick, metal 2 elements are approximately 2.5 μm thick, and metal 3 elements are approximately 10 μm thick.

The RF circuit may include one or more IPD components formed on the substrate 204. For example, FIG. 4 depicts two IPD capacitors (labeled C1 and C3) and IPD RF inductor 200 (labeled L1) associated with the RF circuit. The width of the RF signal line sections, the number of loops formed by RF inductor 200, and other dimensions of the layout are selected to suit the particular application. In accordance with one example embodiment, all sections of RF inductor 200 are formed from gold metallization that is approximately 10 μm thick.

RF inductor 200 is suitably configured to resemble a spiral, as depicted in FIG. 4. In practice, the general topology of the spiral portion may be octagonal (as shown), hexagonal, circular, rectangular, etc. The octagonal topology and number of turns shown in FIG. 4 are not intended to limit or restrict the scope or application of the circuits described herein. The spiral has an interior area 210 that is generally defined by the innermost turn of the spiral. Referring to FIG. 4, IPD capacitor C1 resides in interior area 210.

Inductive RF coupler 202 includes a coupling section 212 having at least one turn configured for magnetic coupling with RF inductor 200. The example shown in FIG. 4 employs a coupling section 212 having a single turn. Alternate embodiments may utilize a coupling section (not shown) having more than one turn. In such multiple-turn embodiments, coupling section 212 may employ air or dielectric bridges (as shown for RF inductor 200) to accommodate crossovers for the conductive traces. Notably, multiple turn coupling sections may be desirable for certain applications that call for increased coupling between RF inductor 200 and inductive RF coupler 202.

For this particular embodiment, coupling section 212 resides within interior area 210. In other words, coupling section 212 as projected onto substrate 204 resides within interior area 210 as projected onto substrate 204. This topology is depicted in the top view of FIG. 4 (recall that coupling section 212 and RF inductor 200 are formed on different metal layers of the electronic device). In practice, the general shape of coupling section 212 may be rectangular (as shown), hexagonal, octagonal, circular, elliptical, square, etc. The rectangular topology shown in FIG. 4 is not intended to limit or restrict the scope or application of the circuits described herein.

Coupling section 212 is preferably located such that it does not overlap (or "underlap" as the case may be) with any portion of RF inductor 200. In this regard, coupling section 212 is distanced away from the inner edge of the innermost turn of RF inductor 200 to minimize capacitive coupling between coupling section 212 and RF inductor 200. Consequently, inductive RF coupler 202 primarily relies on magnetic coupling with RF inductor 200, which is desirable in applications that require high directivity. This configuration enables inductive RF coupler 202 to function effectively as a directional coupler.

In addition to the number of turns in coupling section 212, a measure of RF coupling between inductive RF coupler 202 and RF inductor 200 is influenced by an interior area 214 of inductive RF coupler 202. In practice, the at least one turn of coupling section 212 defines interior area 214, which represents the area roughly "contained" by coupling section 212. Referring to FIG. 4, this interior area 214 will be slightly less than the interior area 210 of the spiral formed by RF inductor 200. Generally, a larger interior area 214 results in higher RF coupling, and a smaller interior area 214 results in lower RF coupling.

Referring to FIG. 3, RF inductor 200 and inductive RF coupler 202 can be cooperatively configured to function as an RF transformer. In this context, RF inductor 200 is suitably configured as a primary winding of the RF transformer, while inductive RF coupler 202 is suitably configured as a secondary winding of the RF transformer. FIG. 3 illustrates the direction of current flow through RF inductor 200 and inductive RF coupler 202, along with a magnetic field 216 established by RF inductor 200. Magnetic field 216 induces RF current in inductive RF coupler 202, which is then measured by a suitably configured circuit (which is typically off-chip).

In practice, the RF circuit may include one or more RF signal line sections and one or more IPD components formed on the common substrate 204. In addition, inductive RF coupler 202 may include a signal line 218 for an output end of coupling section 212, and a signal line 220 for a grounded end of coupling section 212. Signal line 218 may terminate at an IPD matching network or it may be connected to a port or contact pad 206 as shown. Likewise, signal line 220 may terminate at an IPD matching network or it may be connected to a port or contact pad 208 as shown. In turn, ports 206/208 can be wire bonded to an off-chip high impedance circuit. In practical embodiments, a matching network may be realized as a terminating IPD resistor or a parallel combination of one or more IPD resistors and one or more IPD capacitors. The value of the components in a matching network are selected to provide a good impedance match to coupling section 212, i.e., the transmission line of inductive RF coupler 202. A good impedance match is important to establish good coupler directivity.

In this embodiment, signal line 218 is perpendicular to RF inductor 200 at its respective points of intersection, and signal line 220 is perpendicular to RF inductor 200 at its respective points of intersection. In other words, as projected onto semiconductor substrate 204, signal line 218 is normal to the sections of RF inductor 200 that cross over (or pass under) signal line 218. Likewise, as projected onto semiconductor substrate 204, signal line 220 is normal to the sections of RF inductor 200 that cross over (or pass under) signal line 220. This perpendicular arrangement is shown in FIG. 4. This perpendicular arrangement is desirable to minimize or eliminate magnetic coupling near these intersections, which would otherwise influence the performance of RF inductor 200. Moreover, this perpendicular arrangement is desirable to minimize or eliminate capacitive coupling near these intersections.

In practice, the line width of coupling section 212 is relatively narrow to establish a high impedance, thus reducing the need for impedance transformation at the coupled output port. In accordance with the example embodiment, coupling section 212 is formed from gold metallization that is approximately 2 μm wide. The amount of coupling achieved by inductive RF coupler 202 is primarily dictated by the area "encircled" by coupling section 212 and the number of turns in coupling section 212. In operation, a small amount of the RF signal in RF inductor 200 couples into inductive RF coupler 202. In this example, inductive RF coupler 202 is utilized to sense the RF input level of the harmonic filter.

The effectiveness of an RF coupler is measured by the coupling factor and the directivity where coupling is measured as S-parameter $S_{31}$ in a 4-port RF network. The directivity is the difference of $S_{31}$ and $S_{32}$ expressed in dB. Typical values are −15 dB to −30 dB coupling and 14 dB to 20 dB directivity. An implementation of the circuit shown in FIG. 4 resulted in −25.4 dB coupling and 17.9 dB directivity at 1.9 GHz. For comparison, an implementation of a circuit having a double-turn coupling section 212 resulted in −21.8 dB coupling and 17.3 dB directivity at 1.9 GHz. Notably, the coupling improved with the double-turn version without significantly impacting the directivity.

As mentioned above, a matching network and a narrow line width for coupling section 212 may be employed to increase the coupler impedance for matching purposes and to force good directivity. The termination may include a reactive component such as capacitor in parallel with the resistor to provide some frequency tuning of the termination impedance.

Referring back to FIG. 2, an inductive RF coupler may be placed by the L2 inductor on the output side of the harmonic filter circuit to enable sensing of the RF signal output to the next stage of the radio module. The output RF coupler may be deployed in addition to, or in lieu of, the input RF coupler. If an output RF coupler is utilized, a suitable terminating resistor or matching network is preferably configured and located as discussed above to provide positive coupling.

Notably, inductive RF coupler 202 can be realized on an area of substrate 204 that would otherwise be unoccupied. Consequently, the integration of inductive RF coupler 202 with the RF circuit need not result in an increased die size or an increased package size. Furthermore, inductive RF coupler 202 is fabricated using the same semiconductor process technology as the RF circuit, which makes it easy to implement in a practical embodiment.

Figure 5:
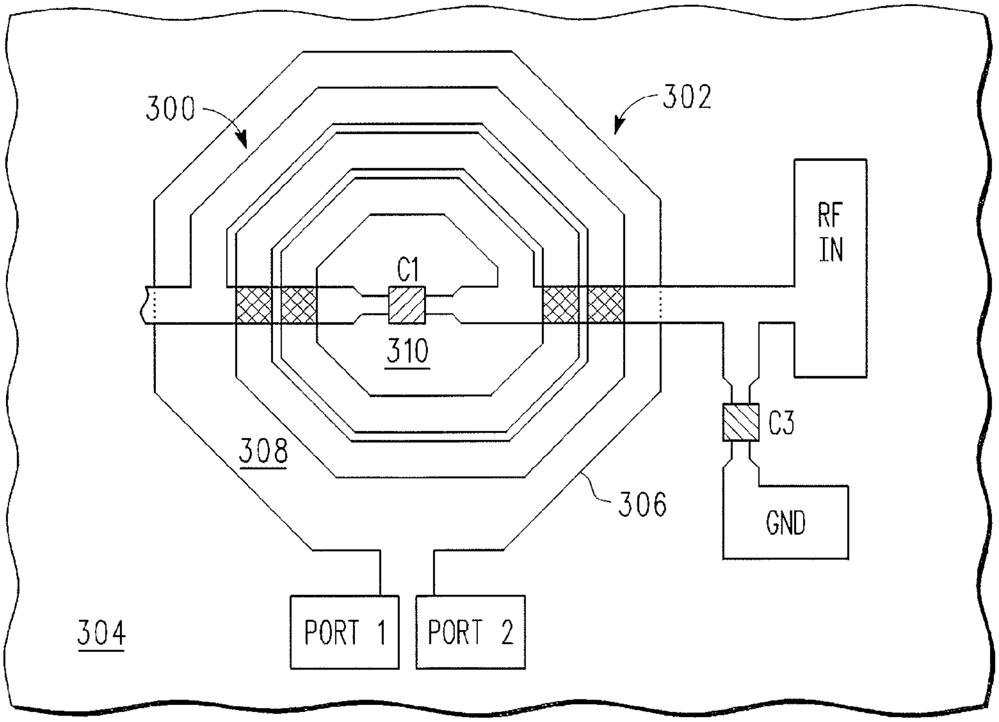
FIG. 5 is a top view of a device layout for an RF inductor and an inductive RF coupler formed on a common substrate in accordance with another embodiment of the invention.

FIG. 5 is a top view of a device layout for an RF inductor 300 and an inductive RF coupler 302 formed on a common substrate 304 in accordance with another embodiment of the invention. The embodiment shown in FIG. 5 shares some features, functions, and characteristics with the embodiment shown in FIG. 4. For the sake of brevity, common features, functions, and characteristics will not be described in detail in the context of RF inductor 300 and inductive RF coupler 302.

In contrast to inductive RF coupler 202, inductive RF coupler 302 includes a coupling section 306 that is located outside the outermost turn of the spiral for RF inductor 300. Thus, the interior area 308 defined by coupling section 306 is larger than the interior area 310 of the spiral. This larger area results in increased coupling relative to the embodiment depicted in FIG. 4. Notably, the portions of coupling section 306 that run under (or pass over) RF inductor 300 are perpendicular to the respective points of intersection with RF inductor 300, for the reasons mentioned above in the description of signal lines 218/220.

In practice, the general shape of coupling section 306 may be octagonal (as shown), rectangular, hexagonal, circular, elliptical, square, etc. The octagonal topology shown in FIG. 5 is not intended to limit or restrict the scope or application of the circuits described herein.

A semiconductor process for fabricating an RF circuit with an integrated inductive RF coupler may begin with an insulating or semiconducting substrate such as GaAs, glass, or ceramic. A suitable dielectric, such as SiN, is then deposited, followed by IPD resistor metal deposition. Refractory metals such as TiW or TiWN may be used for the resistor metal. After photo resist definition, the resistor metal may be reactive ion etched. The patterned metal 1 layer is then formed using plating, deposit-etch or lift-off techniques. The bottom electrode of metal-insulator-metal capacitors and the inductive RF coupler transmission line, including one or more coupling sections as described above, may be formed in this metal 1 layer. Another dielectric layer is deposited to serve as an insulator between the metal 1 and metal 2 layers, and to serve as the insulator of the IPD capacitors. Then, the patterned metal 2 layer is formed using plating, deposit-etch or lift-off techniques. The top electrode of the IPD capacitors may be formed in this layer. Next, another dielectric layer is deposited to serve as an insulator between the metal 2 and metal 3 layers. The air bridge pattern is formed using photoresist techniques, and the patterned metal 3 layer is then formed using plating, deposit-etch or lift-off techniques. The inductor winding may be formed in the metal 3 layer. In practice, the inductor is fabricated using metal 1 and metal 2 stack for the underpass and metal 3 (10 μm gold) for the inductor rings. Finally, the photoresist air bridge layer can be removed, followed by deposition and pattern of the dielectric passivation layer.

As set forth in more detail above, the inductor rings serve as RF signal line sections for coupling with the inductive RF coupler. Depending upon the specific embodiment, the coupling section of the inductive RF coupler may include one or more turns, and it may be located inside the innermost turn of the RF inductor or outside the outermost turn of the RF inductor.

Metal 1 is typically 1 μm thick gold, metal 2 is typically 2.5 μm thick gold, and metal 3 is typically 10 μm thick gold. The dielectric layer between the metal 1 and metal 2 layers may be SiN having a thickness of approximately 1000 Angstroms. This combination can be used as an IPD capacitor, e.g., a metal-insulator-metal stack, providing a capacitor density of 650 $pF/mm^2$. Of course, other specific capacitor parameters can be utilized in a practical embodiment. The dielectric between the metal 1 and metal 3 layers is also SiN, and the thickness of the dielectric between the metal 2 and metal 3 layers is approximately 1000 Angstroms.

Notably, the inductive RF coupler is formed on the same substrate as the RF circuit, using the same semiconductor process technology. In other words, the metal and dielectric materials, the deposition techniques, the etching techniques, and other fabrication techniques need not be customized to produce the inductive RF coupler. The inductive RF coupler can be integrated onto the same chip/die without increasing the physical size of the chip/die, which is desirable for small scale compact applications such as mobile communication devices.

In summary, the systems, devices, and methods described herein relate to:

An electronic device comprising: a semiconductor substrate; a radio frequency (RF) circuit formed on the semiconductor substrate, the RF circuit comprising an RF inductor; and an inductive RF coupler formed on the semiconductor substrate, the inductive RF coupler comprising a coupling section having at least one turn configured for magnetic coupling with the RF inductor. The RF circuit may further comprise a number of integrated passive devices formed on the semiconductor substrate. In an embodiment of the electronic device, the RF inductor is a spiral having an interior area defined by an innermost turn of the spiral, and the coupling section resides within the interior area. In an embodiment of the electronic device, the inductive RF coupler further comprises a first signal line for a grounded end of the coupling section, and a second signal line for an output end of the coupling section, as projected onto the semiconductor substrate, the first signal line is perpendicular to the RF inductor at respective points of intersection, and as projected onto the semiconductor substrate, the second signal line is perpendicular to the RF inductor at respective points of intersection. In an embodiment of the electronic device, the RF inductor is a spiral having an outermost turn, and the coupling section is located outside the outermost turn. The coupling section may be formed from a relatively low metal layer on the semiconductor substrate, and the RF inductor may be formed from a relatively high metal layer on the semiconductor substrate. The RF inductor and the inductive RF coupler can be cooperatively configured as a primary winding of an RF transformer and a secondary winding of the RF transformer, respectively. In an embodiment of the electronic device, the RF circuit is configured as a harmonic filter, and the RF inductor is an input inductor for the harmonic filter. The coupling section may be distanced from the RF inductor to minimize capacitive coupling between the coupling section and the RF inductor. In addition, the inductive RF coupler may be a directional coupler. In an embodiment of the electronic device, the at least one turn of the coupling section defines an interior area of the inductive RF coupler, and a measure of RF coupling between the inductive RF coupler and the RF inductor is influenced by the interior area.

An electronic device comprising: a semiconductor substrate; an inductive radio frequency (RF) coupler formed on a relatively low metal layer on the semiconductor substrate; and an RF inductor formed on a relatively high metal layer on the semiconductor substrate, the RF inductor having an interior area defined by an innermost turn of the RF inductor; wherein the inductive RF coupler comprises a coupling section configured for magnetic coupling with the RF inductor; as projected onto the semiconductor substrate, the coupling section resides within the interior area; and the RF inductor and the inductive RF coupler are cooperatively configured as a primary winding of an RF transformer and a secondary winding of the RF transformer, respectively. This electronic device may further comprise an integrated passive device having at least a portion formed on a relatively intermediate metal layer of the semiconductor substrate. In an embodiment of this electronic device, the inductive RF coupler further comprises a first signal line for a grounded end of the coupling section, and a second signal line for an output end of the coupling section, as projected onto the semiconductor substrate, the first signal line is perpendicular to the RF inductor at respective points of intersection, and as projected onto the semiconductor substrate, the second signal line is perpendicular to the RF inductor at respective points of intersection. Moreover, the RF inductor may be configured as an input inductor for a harmonic filter.

An electronic device fabrication method comprising: forming an inductive radio frequency (RF) coupler on a substrate using a semiconductor process technology, the inductive RF coupler comprising a coupling section having at least one turn; forming an RF inductor on the substrate using the semiconductor process technology, the inductive RF coupler and the RF inductor being formed and configured to accommodate magnetic coupling between the coupling section and the RF inductor; and forming an integrated passive device on the substrate using the semiconductor process technology, the integrated passive device being connected to the RF inductor. The step of forming the inductive RF coupler may comprise forming the inductive RF coupler from a relatively low metal layer on the substrate, and the step of forming the RF inductor may comprise forming the RF inductor from a relatively high metal layer on the substrate. The step of forming the RF inductor may comprise forming the RF inductor as a primary winding of an RF transformer, and the step of forming the inductive RF coupler may comprise forming the inductive RF coupler as a secondary winding of the RF transformer. The step of forming the RF inductor may comprise forming the RF inductor with an interior area defined by an innermost turn of the RF inductor, and the step of forming the inductive RF coupler may comprise forming the coupling section such that, as projected onto the substrate, the coupling section resides within the interior area. The method may further comprise: forming a first signal line of the inductive RF coupler, the first signal line being connected to a grounded end of the coupling section; and forming a second signal line of the inductive RF coupler, the second signal line being connected to an output end of the coupling section; wherein as projected onto the substrate, the first signal line is perpendicular to the RF inductor at respective points of intersection; and as projected onto the substrate, the second signal line is perpendicular to the RF inductor at respective points of intersection.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An electronic device formed on a semiconductor substrate having a first metal layer, a second metal layer that is higher relative to the first metal layer, and a third metal layer that is higher relative to the second metal layer, the electronic device comprising:

a radio frequency (RF) input port for an RF input signal;

an RF output port for an RF output signal;

a first RF spiral inductor formed from the third metal layer, the first RF spiral inductor having a first input end, a first output end, and an interior area defined by an innermost turn of its spiral, the first input end coupled to the RF input port;

a first capacitor realized as an integrated passive device (IPD) formed from the second metal layer, the first capacitor in parallel with the first RF spiral inductor;

a second RF spiral inductor formed from the third metal layer, the second RF spiral inductor having a second input end and a second output end, the second input end coupled to the first output end of the first RF spiral inductor, and the second output end coupled to the RF output port;

a second capacitor realized as an IPD formed from the second metal layer, the second capacitor in parallel with the second RF spiral inductor; and an inductive RF coupler formed from the first metal layer, the inductive RF coupler comprising a coupling section having at least one turn for magnetic coupling with the first RF spiral inductor, the coupling section residing completely within the interior area of the first RF spiral inductor.

2. An electronic device according to claim 1, wherein:

the inductive RF coupler further comprises a first signal line for a grounded end of the coupling section, and a second signal line for an output end of the coupling section;

as projected onto the semiconductor substrate, the first signal line is perpendicular to the first RF spiral inductor at respective points of intersection; and as projected onto the semiconductor substrate, the second signal line is perpendicular to the first RF spiral inductor at respective points of intersection.

3. An electronic device according to claim 1, wherein the first RF spiral inductor and the inductive RF coupler are cooperatively configured as a primary winding of an RF transformer and a secondary winding of the RF transformer, respectively.

4. An electronic device according to claim 1, the coupling section being distanced from the first RF spiral inductor to minimize capacitive coupling between the coupling section and the firs RF spiral inductor.

5. An electronic device according to claim 1, wherein the inductive RF coupler is a directional coupler.

6. An electronic device according to claim 1, wherein:

the at least one turn of the coupling section defines an interior area of the inductive RF coupler; and a measure of RF coupling between the inductive RF coupler and the first RF spiral inductor is influenced by the interior area.

7. The electronic device of claim 1, further comprising:

a third capacitor realized as an IPD formed from the second metal layer, the third capacitor coupled to the RF input port, and the third capacitor forming part of an input impedance matching circuit of the electronic device;

a fourth capacitor realized as an IPD formed from the second metal layer, the fourth capacitor coupled to the first output end of the first RF spiral inductor and to the second input end of the second RF spiral inductor, and the fourth capacitor forming part of a harmonic circuit of the electronic device; and a fifth capacitor realized as an IPD formed from the second metal layer, the fifth capacitor coupled to the RF output port, and the fifth capacitor forming part of an output impedance matching circuit of the electronic device.

8. The electronic device of claim 7, wherein:

the first RF spiral inductor and the first capacitor form a second harmonic circuit of the electronic device;

the second RF spiral inductor and the second capacitor form a third harmonic circuit of the electronic device; and the fourth capacitor forms part of a fourth harmonic circuit of the electronic device.

9. The electronic device of claim 1, wherein:

the coupling section defines an interior area of the inductive RF coupler; and as projected onto the semiconductor substrate, the first capacitor resides within the interior area of the inductive RF coupler.

10. An electronic device formed on a semiconductor substrate having a first metal layer, a second metal layer that is higher relative to the first metal layer, and a third metal layer that is higher relative to the second metal layer, the electronic device comprising:

a radio frequency (RF) input port for an RF input signal;

an RF output port for an RF output signal;

a second harmonic filter having an input and an output, the input of the second harmonic filter coupled to the RF input port, and the second harmonic filter comprising a first RF spiral inductor formed from the third metal layer and comprising a first capacitor realized as an integrated passive device (IPD) formed from the second metal layer, the first capacitor in parallel with the first RF spiral inductor;

a third harmonic filter having an input and an output, the input of the third harmonic filter coupled to the output of the second harmonic filter, the output of the third harmonic filter coupled to the RF output port, and the third harmonic filter comprising a second RF spiral inductor formed from the third metal layer, and comprising a second capacitor realized as an IPD formed from the second metal layer, the second capacitor in parallel with the second RF spiral inductor;

a fourth harmonic filter having a first end coupled to the output of the second harmonic filter and to the input of the third harmonic filter, and having a second end coupled to ground, the fourth harmonic filter comprising a fourth capacitor realized as an IPD formed from the second metal layer; and an inductive RF coupler formed from the first metal layer, the inductive RF coupler comprising a coupling section having at least one turn for magnetic coupling with the first RF spiral inductor or the second RF spiral inductor.

11. The electronic device of claim 10, wherein:

the coupling section is located for magnetic coupling with the first RF spiral inductor; and no portion of the first RF spiral inductor overlaps the coupling section.

12. The electronic device of claim 11, wherein:

the coupling section defines an interior area of the inductive RF coupler; and as projected onto the semiconductor substrate, the first capacitor resides within the interior area of the inductive RF coupler.

13. The electronic device of claim 10, wherein:

the coupling section is located for magnetic coupling with the second RF spiral inductor; and no portion of the second RF spiral inductor overlaps the coupling section.

14. The electronic device of claim 10, further comprising:

a third capacitor realized as an IPD formed from the second metal layer, the third capacitor coupled to the RF input port, and the third capacitor forming part of an input impedance matching circuit of the electronic device; and a fifth capacitor realized as an IPD formed from the second metal layer, the fifth capacitor coupled to the RF output port, and the fifth capacitor forming part of an output impedance matching circuit of the electronic device.

15. An electronic device formed on a semiconductor substrate having a first metal layer, a second metal layer that is higher relative to the first metal layer, and a third metal layer that is higher relative to the second metal layer, the electronic device comprising:

a radio frequency (RF) input port for an RF input signal;

an RF output port for an RF output signal;

a first RF spiral inductor formed from the third metal layer, the first RF spiral inductor having a first input end and a first output end, the first input end coupled to the RF input port;

a first capacitor realized as an integrated passive device (IPD) formed from the second metal layer, the first capacitor in parallel with the first RF spiral inductor;

a second RF spiral inductor formed from the third metal layer, the second RF spiral inductor having a second input end and a second output end, the second input end coupled to the first output end of the first RF spiral inductor, and the second output end coupled to the RF output port;

a second capacitor realized as an IPD formed from the second metal layer, the second capacitor in parallel with the second RF spiral inductor; and an inductive RF coupler formed from the first metal layer, the inductive RF coupler comprising a coupling section having at least one turn for magnetic coupling with the first RF spiral inductor, the coupling section residing completely outside an outermost turn of the first RF spiral inductor.

16. The electronic device of claim 15, further comprising:

a third capacitor realized as an IPD formed from the second metal layer, the third capacitor coupled to the RF input port, and the third capacitor forming part of an input impedance matching circuit of the electronic device;

a fourth capacitor realized as an IPD formed from the second metal layer, the fourth capacitor coupled to the first output end of the first RF spiral inductor and to the second input end of the second RF spiral inductor, and the fourth capacitor forming part of a harmonic circuit of the electronic device; and a fifth capacitor realized as an IPD formed from the second metal layer, the fifth capacitor coupled to the RF output port, and the fifth capacitor forming part of an output impedance matching circuit of the electronic device.

17. The electronic device of claim 16, wherein:

the first RF spiral inductor and the first capacitor form a second harmonic circuit of the electronic device;

the second RF spiral inductor and the second capacitor form a third harmonic circuit of the electronic device; and the fourth capacitor forms part of a fourth harmonic circuit of the electronic device.

18. The electronic device of claim 15, wherein as projected onto the semiconductor substrate, the first capacitor resides within an interior area of the inductive RF coupler.

* * * * *